United States Patent
Yang et al.

(10) Patent No.: US 10,522,196 B2
(45) Date of Patent: Dec. 31, 2019

(54) BANDGAP WITH SYSTEM SLEEP MODE

(71) Applicants: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

(72) Inventors: Chia Chi Yang, Shanghai (CN); Zhi Bing Deng, Shanghai (CN); Cheng-Tai Huang, Shanghai (CN)

(73) Assignees: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

( * ) Notice: Subject to any disclaimer, the term of this patent is extended or adjusted under 35 U.S.C. 154(b) by 0 days.

(21) Appl. No.: 15/714,935

(22) Filed: Sep. 25, 2017

(65) Prior Publication Data
US 2018/0096712 A1 Apr. 5, 2018

(30) Foreign Application Priority Data

Sep. 30, 2016 (CN) .......................... 2016 1 0871307

(51) Int. Cl.
*G11C 5/14* (2006.01)
*G05F 1/575* (2006.01)
(Continued)

(52) U.S. Cl.
CPC .............. *G11C 5/148* (2013.01); *G05F 1/575* (2013.01); *G05F 3/205* (2013.01); *G05F 3/30* (2013.01);
(Continued)

(58) Field of Classification Search
CPC . G05F 1/46; G05F 1/461; G05F 1/462; G05F 1/468; G05F 1/56; G05F 1/561;
(Continued)

(56) References Cited

U.S. PATENT DOCUMENTS 6,310,491 B1 * 10/2001 Ogawa .................. H03K 3/012
326/113
6,531,857 B2 * 3/2003 Ju .............................. G05F 3/30
323/316

(Continued)

FOREIGN PATENT DOCUMENTS

CN 101470457 A 7/2009
CN 103389762 A 11/2013
(Continued)

OTHER PUBLICATIONS

European Application No. 17192400.4, Extended European Search Report dated Feb. 12, 2018, 6 pages.
(Continued)

*Primary Examiner* — Gary L Laxton
*Assistant Examiner* — Carlos O Rivera-Perez
(74) *Attorney, Agent, or Firm* — Kilpatrick Townsend & Stockton LLP

(57) ABSTRACT

A method operates a bandgap voltage reference circuit that includes a bias circuit for receiving a feedback signal and outputting a bias signal, an amplifier for receiving the bias signal and outputting a first reference signal as the feedback signal, an output circuit for receiving the first reference signal and outputting a second reference signal, and an
(Continued)

output switch for outputting the second reference signal as an output signal. The method includes, after powering up the bandgap voltage reference circuit, determining whether the output signal is stable, when the output signal is stable, turning off the output switch; turning off the bias circuit; and turning off the output circuit. The sequential turning off the output switch, the output circuit, and the bias circuit puts the bandgap voltage reference circuit into a sleep mode to save power.

19 Claims, 5 Drawing Sheets

(51) Int. Cl.
| | |
|---|---|
| *G05F 3/20* | (2006.01) |
| *G05F 3/30* | (2006.01) |
| *G11C 7/14* | (2006.01) |
| *H03F 1/14* | (2006.01) |
| *H03F 3/72* | (2006.01) |
| *G06F 21/81* | (2013.01) |

(52) U.S. Cl.
CPC ............... *G06F 21/81* (2013.01); *G11C 7/14* (2013.01); *H03F 1/14* (2013.01); *H03F 3/72* (2013.01)

(58) Field of Classification Search
CPC .......... G05F 1/562; G05F 1/563; G05F 1/565; G05F 1/575; G05F 3/02; G05F 3/08; G05F 3/10; G05F 3/16; G05F 3/20; G05F 3/205; G05F 3/22; G05F 3/222; G05F 3/24; G05F 3/242; G05F 3/26; G05F 3/262; G05F 3/265; G05F 3/267; G05F 3/30; G11C 5/14; G11C 5/147; G11C 5/148; G11C 7/14; H03F 1/14; H03F 3/72; H02M 1/32; H02M 1/36; H02M 3/156; H02M 3/158; H02M 2001/0025; H02M 2001/0032; H02M 2001/0035; H02M 2001/0045
USPC ........ 323/222–226, 266, 269–275, 280–285, 323/304, 311–317, 351, 901; 363/49; 327/141–143, 198, 538–543
See application file for complete search history.

(56) References Cited

U.S. PATENT DOCUMENTS

| | | | | |
|---|---|---|---|---|
| 7,288,926 | B2* | 10/2007 | Lee | ............... G05F 1/465 323/314 |
| 8,269,477 | B2* | 9/2012 | Jo | ............... G05F 3/30 323/313 |
| 2009/0140714 | A1 | 6/2009 | Cho | |
| 2011/0102058 | A1* | 5/2011 | Conte | ............... G05F 3/30 327/512 |
| 2015/0241889 | A1* | 8/2015 | Chen | ............... G05F 1/67 327/143 |
| 2016/0103459 | A1 | 4/2016 | Chern et al. | |

FOREIGN PATENT DOCUMENTS

| | | |
|---|---|---|
| CN | 103901934 A | 7/2014 |
| EP | 1126352 | 8/2001 |

OTHER PUBLICATIONS

Chinese Application No. 201610871307.8, Office Action dated May. 30, 2019, 13 pages (6 pages Of Original Document and 7 pages of English Translation).

\* cited by examiner

BANDGAP WITH SYSTEM SLEEP MODE

CROSS-REFERENCES TO RELATED APPLICATIONS

This application claims priority to Chinese patent application No. 201610871307.8, filed Sep. 30, 2016, the content of which is incorporated herein by reference in its entirety.

FIELD OF THE INVENTION

The present invention generally relates to semiconductor circuits. More particularly, embodiments of the present invention relate to a bandgap voltage reference circuit and method for operating thereof.

BACKGROUND OF THE INVENTION

With the evolution of semiconductor technology, especially the development of wearable electronic products, the demand for low power consumption of electronic products has become increasingly more important in recent years. A bandgap reference voltage source is a stable voltage supply source and is suitable for use in wearable electronic products if its power consumption can be reduced.

Bandgap reference voltage sources can be categorized into different types depending on power consumption and noise immunity. In general, a reduction in the power consumption of a bandgap reference voltage source also reduces its noise immunity. For example, current bandgap reference voltage sources can be categorized into 10 uA, 5 uA, and 1 uA types. The 10 uA bandgap reference voltage source has the highest noise immunity and consumes the highest power. The noise immunity of the 5 uA bandgap reference voltage source is lower than that of the 10 uA bandgap reference voltage source, accordingly, the 5 uA bandgap reference voltage source is not suitable for high-speed applications. The noise immunity of the 1 uA bandgap reference voltage source is the lowest, so that the 1 uA bandgap reference voltage source is only suitable for low-speed applications.

However, the power consumption of even the 1 uA bandgap reference voltage source is still too high to be suitable for wearable electronic products. One of the reasons is that the bandgap reference voltage source is in an always-on state. Thus, the current approach for improving the bandgap reference voltage source requires a trade-off between power consumption and noise immunity, or a combination of a low-power, noise-immunity bandgap reference voltage source and a high-power, high-immunity bandgap reference voltage source through system control to reduce the power consumption. However, this approach has the drawbacks of increasing the system operation complexity and the electronic circuit layout area.

Therefore, a novel bandgap reference voltage source and method of operating the same is needed to achieve high noise immunity at low power consumption.

BRIEF SUMMARY OF THE INVENTION

The present inventors have discovered the above-described problems and propose a novel a bandgap reference voltage circuit and method of operating the bandgap reference voltage circuit that achieve high noise immunity at low power consumption.

In accordance with the present invention, a method for operating a bandgap reference voltage circuit is provided. The bandgap reference voltage circuit may include a bias circuit for receiving a feedback signal and outputting a bias signal in response to the feedback signal, an amplifier for receiving the bias signal and outputting a first reference signal as the feedback signal, an output circuit for receiving the first reference signal and outputting a second reference signal, and an output switch for outputting the second reference signal as an output signal. The method may include, after powering up the bandgap voltage reference circuit, determining that the output signal is a stable signal, turning off the output switch; after turning off the output switch, turning off the bias circuit; and after turning off the bias circuit, turning off the output circuit.

In one embodiment, the bandgap voltage reference circuit may further includes a start circuit for providing a start signal to the bias circuit when the bandgap voltage reference circuit is powered up, the bias circuit further receives the start signal and outputs the bias signal in response to the start signal, the method may further include, after turning off the output switch, turning off the start circuit prior to turning off the bias circuit.

In one embodiment, the start circuit stops providing the start signal when the bandgap voltage reference circuit is operating in a desired state.

In one embodiment, the method may further include, after turning off the output switch, turning on again the bias circuit when the output signal is attenuated to satisfy a predetermined condition.

In one embodiment, the method may further include, after turning on again the bias circuit and the outputted first reference signal is a stable signal, turning on again the output circuit and turning on again the output switch.

In one embodiment, the method may further includes at least one of the following:
a) turning off the output switch comprises powering down the output switch or providing a control signal to a control terminal of the output switch to turn off the output switch;
b) turning off the bias circuit comprises powering down the bias circuit; and
c) turning off the output circuit comprises powering down the output circuit.

In one embodiment, the method may further include turning off the start circuit. In one embodiment, turning off the start circuit comprises powering down the start circuit.

In one embodiment, the method may further include turning on the output switch when determining that the output signal is below a predetermined threshold value.

Embodiments of the present invention also provide a novel bandgap voltage reference circuit. The bandgap voltage reference circuit may include a bias circuit configured to receive a feedback signal and output a bias signal in response to the feedback signal; an amplifier configured to receive the bias signal and output a first reference signal; an output circuit configured to receive the first reference signal and output a second reference signal; and an output switch configured to output the second reference signal as an output signal.

In one embodiment, the bandgap voltage reference circuit may further include a start circuit coupled to the bias circuit and configured to provide a start signal to the bias circuit.

In one embodiment, the bandgap voltage reference circuit may further include a first switch coupled between a first supply voltage and the start circuit, a second switch coupled between the start circuit and a second supply voltage lower than the first supply voltage; a third switch coupled between the first supply voltage and the bias circuit, a fourth switch coupled between the bias circuit and the second supply voltage; and a fifth switch coupled between the first supply voltage and the output circuit, a sixth switch coupled between the output circuit and the second supply voltage.

In one embodiment, the first, third, and fifth switches each include a PMOS transistor, and the second, fourth, and sixth switches each include an NMOS transistor.

In one embodiment, the bias circuit includes a first PMOS transistor having a gate connected to the start circuit, a source connected to one terminal of the third switch, and a drain; a second PMOS transistor having a gate connected to the start circuit, a source connected to the source of the first PMOS transistor, and a drain; a first BJT transistor having an emitter connected to the drain of the first PMOS transistor, and a base and a collector connected together to one terminal of the fourth switch; a first resistor having one terminal connected to the drain of the second PMOS transistor; a second BJT transistor having an emitter connected to another terminal of the first resistor, and a base and a collector connected together and to the one terminal of the fourth switch.

In one embodiment, the output circuit includes a third PMOS transistor having a gate connected to the gate of the second PMOS transistor and an output terminal of the amplifier, a source connected to one terminal of the fifth switch, and a drain connected to a terminal of the output switch; a second resistor having one terminal connected to the drain of the third PMOS transistor; a third BJT transistor having an emitter connected to another terminal of the second resistor and a gate and a collector connected together and to one terminal of the sixth switch.

In one embodiment, the bandgap voltage reference circuit may further include a control circuit coupled to the output switch and configured to turn on and off the output switch. In one embodiment, the control circuit turns off the output switch when the output signal is stable and turns on the output switch when the output signal is below a predetermined threshold value.

The following description, together with the accompanying drawings, will provide a better understanding of the nature and advantages of the claimed invention.

DETAILED DESCRIPTION OF THE INVENTION

Figure 1:
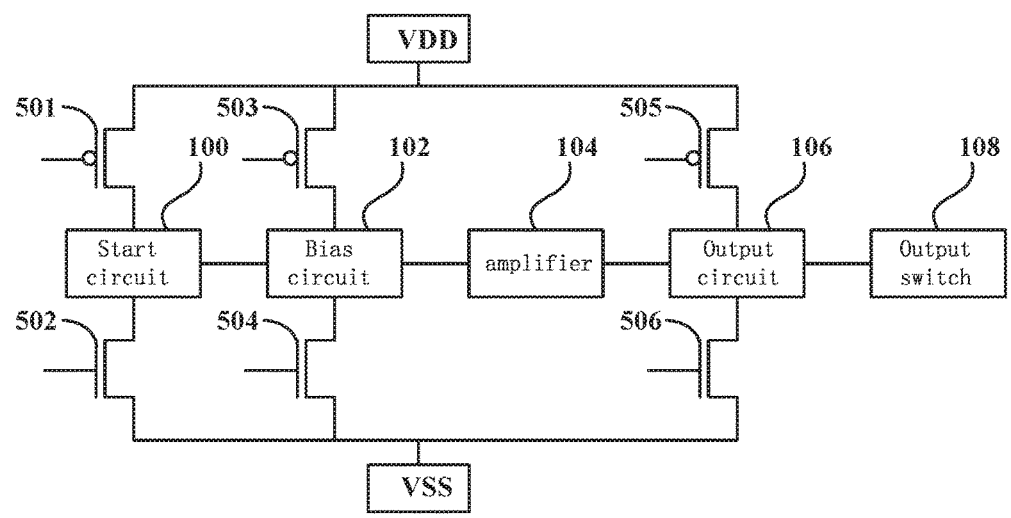
FIG. 1 is a simplified schematic block diagram of a bandgap voltage reference circuit that is operated by a method according to an embodiment of the present invention.

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

It will be understood that the drawings are not drawn to scale, and similar reference numbers are used for representing similar elements. Embodiments of the invention are described herein with reference to functional block diagrams that are schematic illustrations of idealized embodiments (and intermediate structures) of the invention.

As used herein, the terms "a", "an" and "the" may include singular and plural references. It will be further understood that the terms "comprising", "including", "having", "containing" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

It will be understood that, when an element is referred to as "adjacent to," "connected to," or "coupled to" another element, it can be disposed adjacent to, connected or coupled to the other element, or intervening elements may also be present. In contrast, when an element is referred to as being "directly connected to," or "directly coupled to" another element, there are no intervening elements present between them. It will be understood that, although the terms "first," "second," "third," etc. may be used herein to describe various elements, components, regions, and/or sections, these elements, components, regions, and/or sections should not be limited by these terms. These terms are only used to distinguish one element, component, region, or section from another region, or section. Thus, a first element, component, region, or section discussed below could be termed a second element, component, region, or section without departing from the teachings of the present invention.

As used herein, the terms "logic low" and "low logic level" may be used interchangeably. The terms "logic high" and "high logic level" may be used interchangeably. The terms "signal" and "signal pin" may be used interchangeably.

Notice that similar reference numerals and letters refer to similar items in the following figures, and thus once an item is defined in a figure, it may not be discussed or further defined in following figures.

Figure 2:
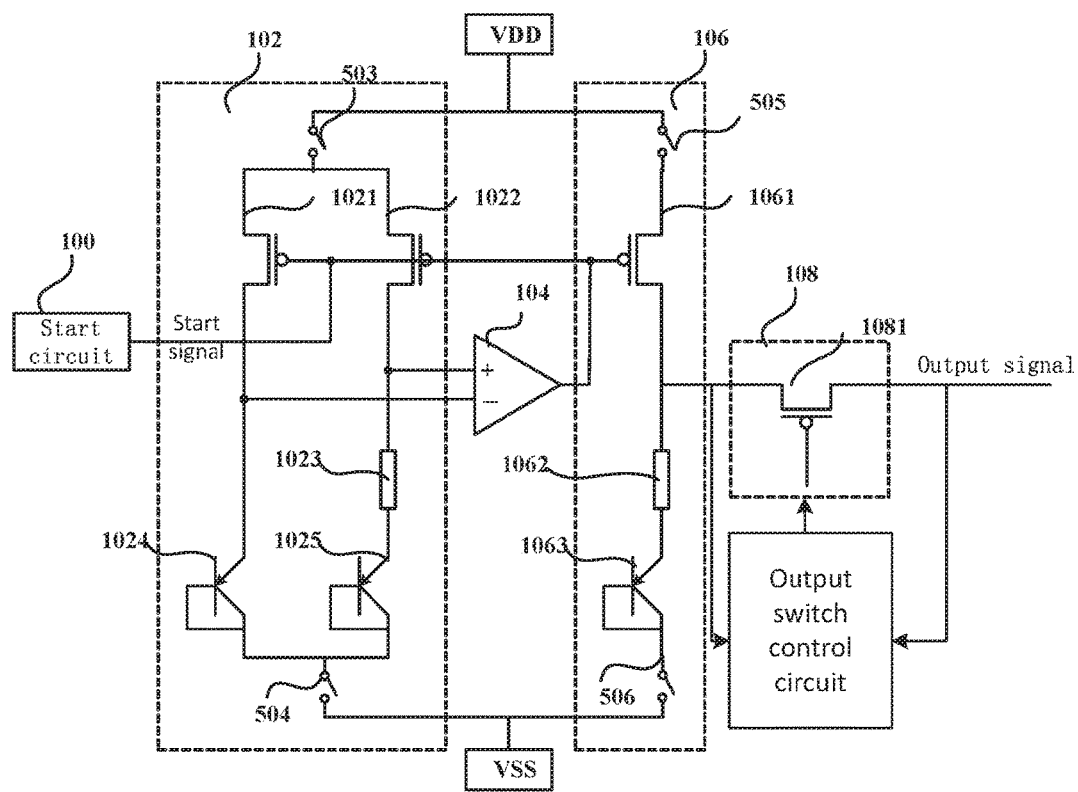
FIG. 2 is a simplified schematic circuit diagram of a bandgap voltage reference circuit that is operated by a method according to an embodiment of the present invention.

FIG. 1 is a simplified schematic block diagram of a bandgap voltage reference circuit that is operated by a method according to an embodiment of the present invention. FIG. 2 is a simplified schematic circuit diagram of a bandgap voltage reference circuit that is operated by a method according to an embodiment of the present invention. A bandgap reference circuit according to an embodiment of the present invention will be described below with reference to FIGS. 1 and 2.

Referring to FIG. 1, the bandgap reference circuit may include a bias circuit 102, an amplifier 104, an output circuit 106, an output switch 108, a third switch 503 and a fourth switch 504 associated with the bias circuit, a fifth switch 505 and a sixth switch 506 associated with the output circuit. In an embodiment, the bandgap reference circuit may also include a start circuit 100 that may include a first switch 501 and a second switch 502. The switches of each circuit may be a PMOS transistor, an NMOS transistor, or other switching circuit. The present invention is not limited to a specific type of switches.

Bias circuit 102 is configured to receive a feedback signal and provide a bias signal based on the feedback signal. Amplifier 104 is configured to receive the bias signal provided by bias circuit 102 and provide a first reference signal based on the received bias signal. The first reference signal may have, for example, a first reference voltage. The first reference signal is also fed back as the feedback signal to bias circuit 102. Output circuit 106 receives the first reference signal and outputs a second reference signal based on the first reference signal. The second reference signal passes through output switch 108 as an output signal.

In one embodiment, referring to FIG. 2, bias circuit 102 may include a first PMOS transistor 1021, a second PMOS transistor 1022, a first resistor 1023, a first bipolar junction transistor (BJT) 1024, and a second BJT transistor 1025. First BJT transistor 1024 and second BJT transistor 1025 each have a respective base connected to a respective collector and connected to a voltage VSS through fourth switch 504. The voltage VSS may be, for example, a ground potential or a first common reference potential. An emitter of first BJT transistor 1024 is connected to a drain of first PMOS transistor 1021. First resistor 1023 has one terminal connected to the emitter of second BJT transistor 1025 and another terminal connected to the drain of second PMOS transistor 1022. First PMOS transistor 1021 and second PMOS transistor 1022 each have a source connected to a voltage VDD through third switch 503. The voltage VDD may be a power supply voltage or a second common reference potential that is higher than the first common reference potential. First PMOS transistor 1021 has a drain connected to a negative input terminal of amplifier 104, and second PMOS transistor 1022 has a drain connected to a positive input terminal of amplifier 104 for providing the bias signal to the amplifier. In one embodiment, first PMOS transistor 1021 and second PMOS transistor 1022 each have a gate connected to start circuit 100. Start circuit 100 is configured to provide a start signal to bias signal 102 when the bandgap voltage reference circuit is activated or powered up (i.e., the bandgap voltage reference circuit is supplied with a power supply voltage) to cause the bandgap voltage reference circuit to enter into a desired state (i.e., the desired operating condition).

Figure 5:
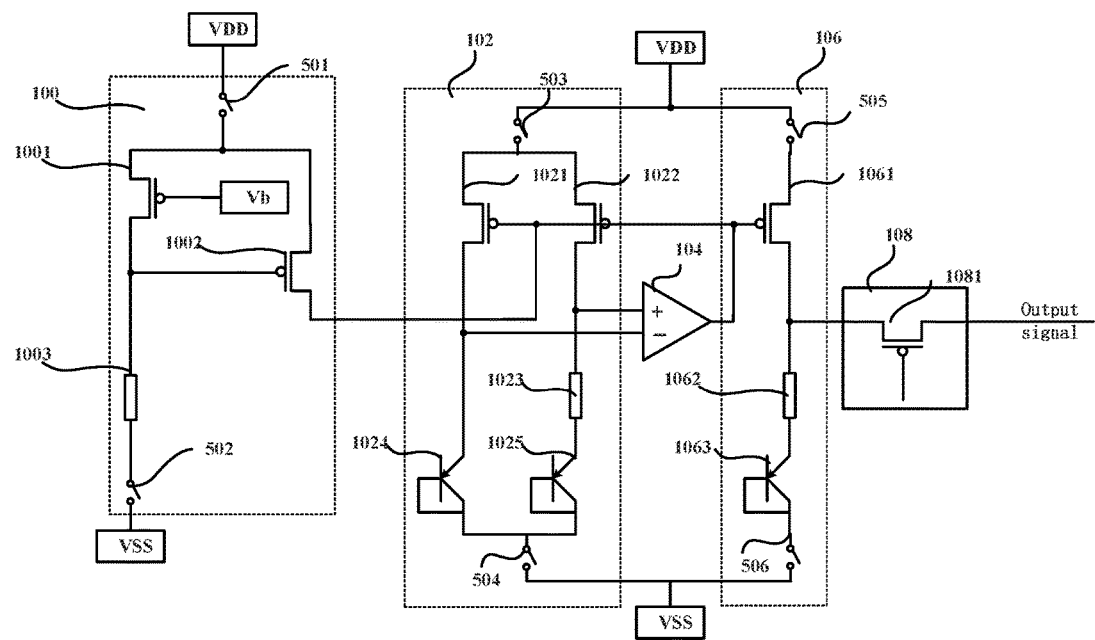
FIG. 5 is a simplified schematic circuit diagram of a bandgap voltage reference circuit that is operated by a method according to an embodiment of the present invention.

In another embodiment, start circuit 100 may include a fifth PMOS transistor 1001, a sixth PMOS transistor 1002, a third resistor 1003, a first switch 501 and a second switch 502, as shown in FIG. 5. Fifth PMOS transistor 1001 and sixth PMOS transistor 1002 each have a source connected to the voltage VDD through first switch 501. Fifth PMOS transistor 1001 has a gate connected to a voltage Vb, a drain connected to the gate of sixth PMOS transistor 1002 and to one terminal of third resistor 1003. Another terminal of third resistor 1003 is connected to the voltage VSS through second switch 502. The drain of sixth PMOS transistor 1002 provides a start signal to bias circuit 102.

Amplifier 104 receives the bias signal and outputs the first reference signal at its output terminal. The reference signal may have a first reference voltage. The first reference voltage is fed back to bias circuit 102 as a feedback signal. In a specific embodiment, the output of amplifier 104 is connected to the gate of first PMOS transistor 1021 and the gate of second PMOS transistor 1022.

Output circuit 106 may include a third PMOS transistor 1061, a second resistor 1062, a third BJT transistor 1063, a fifth switch 505, and a sixth switch 506. Third PMOS transistor 1061 has a gate connected to the output terminal of amplifier 104 for receiving the first reference signal that may have a first reference voltage, a source connected to the supply voltage VDD through fifth switch 505, and a drain connected to one terminal of second resistor 1062 to output the second reference signal through the output switch. Another terminal of second resistor 1062 is connected to the emitter of third BJT transistor 1063. The base of third BJT transistor 1063 is connected to the collector and to the voltage VSS through sixth switch 506.

In one embodiment, output switch 108 may include a fourth PMOS transistor 1081, but the present invention is not limited thereto. For example, output switch 108 may be implemented by various transmission gates. In one embodiment, the bandgap voltage reference circuit may also include additional output switch control circuitry to control the on/off of output switch 108, and the present invention is not limited thereto. Fourth PMOS transistor 1081 has a source connected to the drain of third PMOS transistor 1061 and receives the second reference signal through the source and outputs the received second reference signal as an output signal through the drain of the fourth PMOS transistor. Fourth PMOS transistor 1081 has a gate connected to a control signal, for example, to an output switch control circuit. In one embodiment, the output switch control circuit may also be connected to the output of the bandgap voltage reference circuit for receiving the output signal to determine whether the output signal is stable, whether the attenuation satisfies a predetermined condition, and to turn off fourth transistor 1081 according to the output signal. For example, when the output signal is stabilized (i.e., the output signal is a stable signal), fourth PMOS transistor 1081 is turned off. When the attenuation of the output signal satisfies a predetermined condition (e.g., the output signal is below a predetermined threshold value), after output circuit 106 is turned on, fourth PMOS transistor 1081 is turned on. The output switch control circuit may include various circuitry types, such as comparators, D flip-flops, counters, timers, etc. as understood by those of skill in the art. When the output signal is below a predetermined threshold value for more than a predetermined time, fourth transistor 1081 is turned on. When the output signal is stabilized (i.e., a stable signal), fourth transistor 1081 is turned off.

It will be appreciated by those of skill in the art that only a specific embodiment of a bandgap voltage reference circuit is provided herein, and a method for operating the bandgap voltage reference circuit provided herein is also applicable to other bandgap voltage reference circuit types.

Figure 3:
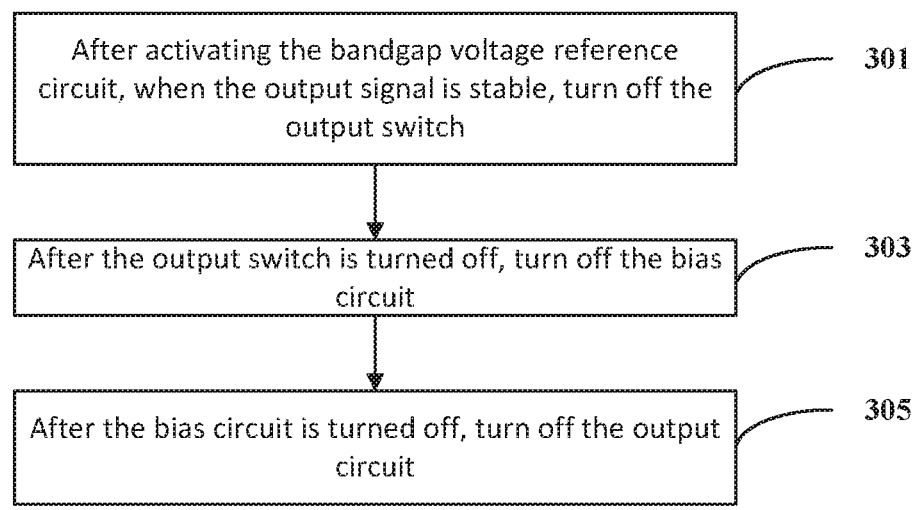
FIG. 3 is a flowchart of a method of operating a bandgap voltage reference circuit according to an embodiment of the present invention.

FIG. 3 is a flowchart of a method of operating a bandgap voltage reference circuit according to an embodiment of the present invention. The method for operating a bandgap voltage reference circuit will be described in detail with reference to FIGS. 1, 2, and 3.

Referring to FIG. 3, the method may include the following steps:

Step 301: after powering up (activating) the bandgap voltage reference circuit, when the output signal is stable, turning off the output switch.

Step 303: after the output switch is turned off, turning off the bias circuit.

Step 305: after the bias circuit is turned off, turning off the output circuit.

In one embodiment, referring to FIG. 3, the output switch control circuit in output switch 108 receives the output signal, when the output signal is stable, fourth PMOS transistor 1081 is turned off, thereby opening output switch 108 (i.e., non-conductive). Then, after output switch 108 is turned off, bias circuit 102 is turned off. Then, after bias circuit 102 is turned off, output circuit 106 is turned off.

The method of turning off output switch 108 may include powering down (e.g., disconnect from the power supply voltage) output switch 108 or providing a control signal to the control terminal (e.g., gate) of output switch 108 to turn it off. In a specific embodiment, fourth transistor 1081 may be controlled by the output switch control circuit as shown in FIG. 2, fourth PMOS transistor 1081 may be placed at a high logic level to turn off fourth PMOS transistor 1081, or output switch 108 may also be turned off by powering down fourth PMOS transistor 1081.

The method of turning off bias circuit 102 may include powering down bias circuit 102. For example, the power down may be implemented by opening third switch 503 that connects the power supply voltage VDD to the source of first PMOS transistor 1021 and the source of second PMOS transistor 1022. Alternatively, the power down may be implemented by opening fourth switch 504 that connects the collector of first BJT transistor 1024 and the collector of second BJT transistor 1025 to the voltage VSS. The switches of the bias circuit may include PMOS circuit, NMOS circuit, and other types of electronic switches known to those of skill in the art, and the present invention is not limited thereto.

The method of turning off output circuit 106 may include powering down output circuit 106. For example, the power down of the output circuit may be implemented by opening fifth switch 505 that connects between third PMOS transistor 1061 to the power supply voltage VDD, or by opening sixth switch 506 that connects third BJT transistor 1063 to the voltage potential VSS. The switches of the output circuit may include PMOS circuit, NMOS circuit, and other types of electronic switches known to those of skill in the art, and the present invention is not limited thereto.

In the operation method of the bandgap voltage reference circuit of the present invention, in the case where a new calibration is not performed, after the output signal is stable, the output switch, the bias circuit and the output circuit are in turn turned off. Turning off the output switch, the bias circuit and the output circuit in this sequence is equivalent to introduce a sleep mode to the bandgap voltage reference circuit. At this point, the current consumption of the bandgap voltage reference circuit is only the leakage current, the bandgap voltage reference circuit is in put in a low power state, which can effectively reduce power consumption.

Figure 4:
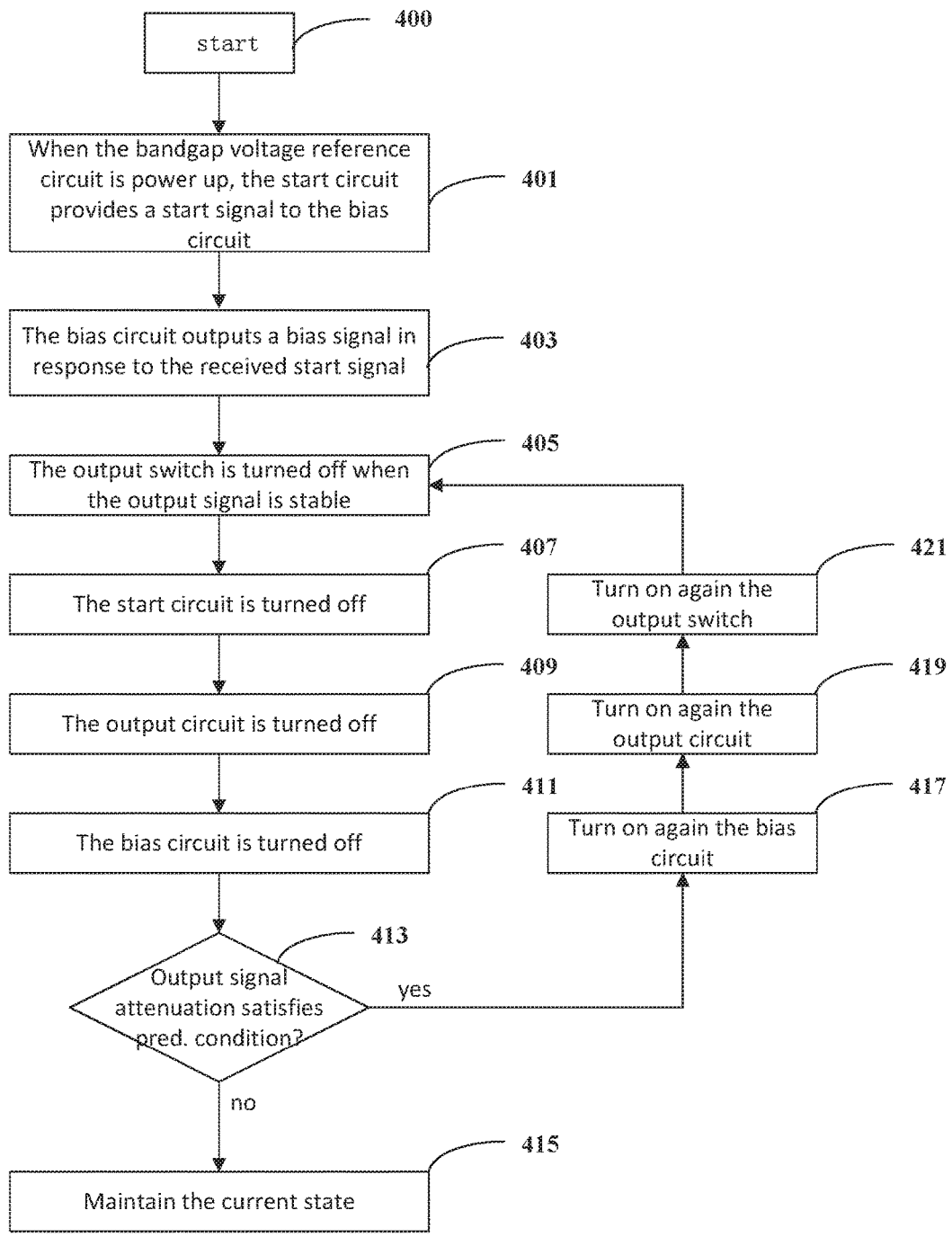
FIG. 4 is a flowchart of a method of operating a bandgap voltage reference circuit according to another embodiment of the present invention.

FIG. 4 is a flowchart of a method for operating a bandgap voltage reference circuit according to another embodiment of the present invention. The operation method of the bandgap voltage reference circuit of the present invention will be described in detail below with reference to FIGS. 1, 2, and 4.

The method begins at step 400. In one embodiment, the bandgap voltage reference circuit is powered up (activated).

Step 401: the start circuit provides a start signal to the bias circuit when the bandgap voltage reference circuit is powered up.

In one embodiment, referring to FIGS. 1 and 2, start circuit 100 has an output terminal connected to the gate of first PMOS transistor 1021 and the gate of second PMOS transistor 1022 in bias circuit 102. The start signal at the output terminal of start circuit 100 sets the gates at a low logic potential to turn on first and second PMOS transistors 1021 and 1022.

Step 403: the bias circuit receives the start signal and generates a bias signal in response to the start signal.

In one embodiment, referring to FIG. 2, amplifier 104 has an input terminal configured to receive the bias signal and an output terminal configured to output a first reference signal (a first reference voltage) and feeds the first reference signal as a feedback signal to bias circuit 102. Output circuit 106 receives the first reference signal and outputs a second reference signal through output switch 108 as an output signal. Output switch 108 supplies the second reference signal as an output signal to supply power to an electronic device.

Step 405: the output switch is turned off when the output signal is stable.

In one embodiment, referring to FIG. 2, the output switch control circuit in output switch 108 receives the output signal and turns off fourth PMOS transistor 1081, and in the case where the output signal is stable, the output switch control circuit turns off output switch 108.

Step 407: the start circuit is turned off.

In one embodiment, start circuit 100 only supplies a start signal to bias circuit 102 when the bandgap voltage reference circuit is powered up. When the start circuit is turned off in step 407, after the bandgap voltage reference circuit enters the sleep mode, the start circuit will not be turned on again when the bandgap voltage reference circuit is woken up from the sleep mode.

Step 409: the output circuit is turned off.

Step 411: the bias circuit is turned off.

In one embodiment, output circuit 106 and bias circuit 102 may be turned off in turn (sequentially) by the manner described above in the example embodiment of FIG. 3 to put the bandgap voltage reference circuit into the sleep mode.

Step 413: determine whether or not the output signal attenuation satisfies a predetermined condition. It the predetermined condition is satisfied, the method proceeds to step 415. If the predetermined condition is not satisfied, the method proceeds to step 417.

Step 415: maintain the current state, i.e., the bandgap voltage reference circuit is kept in the sleep mode.

Step 417: turn on again the bias circuit.

In one exemplary embodiment, the determination whether or not the output signal attenuation satisfies a predetermined condition can be performed using an output switch control circuit. The predetermined condition may be that the output signal is below a threshold voltage, or the output signal is below a threshold voltage for a predetermined time. When the output signal satisfies the predetermined condition, bias circuit 102 is activated (i.e., powered up), for example, bias circuit 102 is activated by turning on the switches of bias circuit 102.

Step 419: turn on again the output circuit.

In one embodiment, output circuit 106 may be activated by turning on the switches (505, 506) of output circuit 106.

Step 421: turn on again the output switch.

In one embodiment, referring to FIG. 2, the output switch control circuit, after determining that output circuit 106 is activated, turns on fourth PMOS transistor 1081 again to turn on output switch 108. Thereafter, go to step 405.

In the embodiment of the operation method of the bandgap voltage reference circuit in FIG. 4, after the output signal is stable without performing a new calibration circuit, the output switch, the bias circuit, and the output circuit are in turn (sequentially) turned off, that is equivalent to introduce a sleep mode to the bandgap voltage reference circuit. At this point, the current consumption of the bandgap voltage reference circuit is only the leakage current, the bandgap voltage reference circuit is in set in a low power state, which can effectively reduce power consumption.

When the output signal attenuation satisfies the predetermined condition, the output signal can be quickly turned on according to the method of the present invention.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A method for operating a bandgap voltage reference circuit comprising a bias circuit for receiving a feedback signal and outputting a bias signal in response to the feedback signal, an amplifier for receiving the bias signal and outputting a first reference signal as the feedback signal, an output circuit for receiving the first reference signal and outputting a second reference signal, an output switch for outputting the second reference signal as an output signal, and a control circuit disposed across the output switch and having a first input configured to receive the second reference signal, and a second input configured to receive the output signal, the method comprising:
   after powering up the bandgap voltage reference circuit, determining whether the output signal is a stable signal, in the event that the output signal is a stable signal:
   turning off the output switch by the control circuit;
   after turning off the output switch, turning off the bias circuit; and
   after turning off the bias circuit, turning off the output circuit.

2. The method of claim 1, wherein the bandgap voltage reference circuit further comprises a start circuit for providing a start signal to the bias circuit when the bandgap voltage reference circuit is powered up, the bias circuit outputs the bias signal in response to the start signal, the method further comprising:
   after turning off the output switch, turning off the start circuit prior to turning off the bias circuit.

3. The method of claim 2, wherein the start circuit stops providing the start signal when the bandgap voltage reference circuit is operating in a desired state.

4. The method of claim 2, further comprising turning off the start circuit.

5. The method of claim 4, wherein turning off the start circuit comprises powering down the start circuit.

6. The method of claim 1, further comprising, after turning off the output switch:
   turning on again the bias circuit when the output signal is attenuated to satisfy a predetermined condition.

7. The method of claim 6, further comprising:
   after turning on again the bias circuit and the outputted first reference signal is a stable signal, turning on again the output circuit and turning on again the output switch.

8. The method of claim 6, further comprising at least one of the following:
   a) turning off the output switch comprises powering down the output switch or providing a control signal to a control terminal of the output switch to turn off the output switch;
   b) turning off the bias circuit comprises powering down the bias circuit; and
   c) turning off the output circuit comprises powering down the output circuit.

9. The method of claim 1, further comprising:
   determining whether the output signal is below a predetermined threshold value, in the event that the output signal is below the predetermined threshold value:
   turning on again the bias circuit;
   after turning on again the output circuit; and
   turning on again the output switch.

10. A bandgap voltage reference circuit comprising: a bias circuit configured to receive a feedback signal and output a bias signal in response to the feedback signal; an amplifier configured to receive the bias signal and output a first reference signal; an output circuit configured to receive the first reference signal and output a second reference signal; an output switch configured to output the second reference signal as an output signal; and a control circuit disposed across the output switch and having a first input configured to receive the second reference signal, and a second input configured to receive the output signal, wherein the control circuit is configured to turn off the output switch when the output signal is stable, wherein the bias circuit is turned off after the output switch has been turned off, and wherein the output circuit is turned off after the bias circuit has been turned off.

11. The bandgap voltage reference circuit of claim 10, further comprising:
   a start circuit coupled to the bias circuit and configured to provide a start signal to the bias circuit.

12. The bandgap voltage reference circuit of claim 11, further comprising:
   a first switch coupled between a first supply voltage and the start circuit, a second switch coupled between the start circuit and a second supply voltage lower than the first supply voltage;
   a third switch coupled between the first supply voltage and the bias circuit, a fourth switch coupled between the bias circuit and the second supply voltage; and
   a fifth switch coupled between the first supply voltage and the output circuit, a sixth switch coupled between the output circuit and the second supply voltage.

13. The bandgap voltage reference circuit of claim 12, wherein the first, third, and fifth switches each comprise a PMOS transistor, and the second, fourth, and sixth switches each comprise an NMOS transistor.

14. The bandgap voltage reference circuit of claim 12, wherein the bias circuit comprises:
- a first PMOS transistor having a gate connected to the start circuit, a source connected to one terminal of the third switch, and a drain;
- a second PMOS transistor having a gate connected to the start circuit, a source connected to the source of the first PMOS transistor, and a drain;
- a first BJT transistor having an emitter connected to the drain of the first PMOS transistor, and a base and a collector connected together to one terminal of the fourth switch;
- a first resistor having one terminal connected to the drain of the second PMOS transistor;
- a second BJT transistor having an emitter connected to another terminal of the first resistor, and a base and a collector connected together and to the one terminal of the fourth switch.

15. The bandgap voltage reference circuit of claim 14, wherein the output circuit comprises:
- a third PMOS transistor having a gate connected to the gate of the second PMOS transistor and an output terminal of the amplifier, a source connected to one terminal of the fifth switch, and a drain connected to a terminal of the output switch;
- a second resistor having one terminal connected to the drain of the third PMOS transistor;
- a third BJT transistor having an emitter connected to another terminal of the second resistor and a base and a collector connected together and to one terminal of the sixth switch.

16. The bandgap voltage reference circuit of claim 10, wherein the control circuit is further configured to turn on the output switch when the output signal is below a predetermined threshold value.

17. The bandgap voltage reference circuit of claim 10, wherein the output switch comprises a fourth PMOS transistor having a source connected to a third PMOS transistor, and a gate connected to the control circuit.

18. The bandgap voltage reference circuit of claim 10, wherein the control circuit is further configured to determine whether the received output signal satisfies a predetermined condition and generates a control signal to turn on or off the output switch in response to a determination result of the satisfaction of the predetermined condition.

19. The bandgap voltage reference circuit of claim 10, further comprising:
- a first supply source having a first supply voltage;
- a second supply source having a second supply voltage lower than the first supply voltage;
- wherein the bias circuit is indirectly connected to the first supply source and the second supply source, and the output circuit is indirectly connected to the first supply source and the second supply source.

* * * * *